2-amino-3-nitrobenzoic acid is prepared by heating 2-hydroxyl-3-nitrobenzoic acid or a salt thereof to a temperature of about 120° C. to about 180° C. with ammonium hydroxide or a solution of ammonium hydroxide in a lower alkanol.

This invention relates to a process for the preparation of 2-amino-3-nitrobenzoic acid.

The production of 2-amino-3-nitrobenzoic acid has heretofore followed several different routes. For example, it may be prepared by the oxidation of 2-acetamido-3-nitrotoluene as taught in the "J. Chem. Soc." 117, 775 (1920) or by Hofman degradation of 3-nitro-phthalamic-2-acid-1 as taught in "J. Chem. Soc." 127, 1795 (1925), while "Rec. Trav. Chim." 20, 209 (1901) reveals the preparation of 2-amino-3-nitrobenzoic acid from the reaction of 2-chloro-3-nitrobenzoic acid with alcoholic ammonia. "Ann." 195, 37 (1879) describes the production of 3-nitro-2-amino benzamide by the reaction of ethyl 3-nitro-2-ethoxy-benzoate with ammonia in ethanol. These known methods have not proven entirely satisfactory because of several disadvantages, for example, the starting materials of these processes are difficult to prepare and the processes are not economically attractive.

I have found a new method for preparing said 2-amino-3-nitrobenzoic acid, whereby the difficulties attendant with the prior art processes are overcome and consequently provide an efficient and economical source of said 2-amino-3-nitrobenzoic acid.

Accordingly, it is an object of my invention to provide an economical process for the preparation of 2-amino-3-nitrobenzoic acid in good yields. Other objects and advantages of this invention will appear from the following description.

The attainment of the above object is made possible by the present invention, which broadly comprises producing 2-amino-3-nitrobenzoic acid by reacting a nitrophenyl compound with ammonium hydroxide or alcoholic solutions of ammonium hydroxide.

In accordance with my invention, 2-amino-3-nitrobenzoic acid may be prepared by mixing 3-nitrosalicylic acid or a metallic salt thereof with ammonium hydroxide per se or in an alcoholic medium and heating the reaction mixture to a temperature in the range of about 120° C. to about 180° C. for an extended time to effect the replacement of the hydroxy group on the salicylic acid with an amino radical. Said 2-amino-3-nitrobenzoic acid may then be recovered by known means, for example, by acidifying the reaction mixture and recovering the precipitate by conventional methods, for example, filtration, centrifuging, etc. While the mole amount of the salicylic acid to ammonium hydroxide normally will be in the ratio of about 1 mole of salicylic acid to about 2 moles of ammonium hydroxide, or about one mole of ammonium hydroxide if the salt form of the salicylic acid is used, a slight excess of the ammonium hydroxide may be desirable to insure complete replacement of the hydroxy group. As mentioned above, it will be readily understood that the 3-nitrosalicylic acid starting material may be used in its free acid form or in its salt form, such salts being the conventional alkali metal or alkali earth metal salts, such as ammonium, sodium, potassium, barium, etc.

Among the various alcohols that may be mentioned for use if the reaction takes place in an alcoholic medium are the lower aliphatic alcohols of 1 to 5 carbon atoms such as, methanol, ethanol, propanol, butanol, isopropanol, etc. The percent of alcohol present in the alkali solution is not critical to the operation of the instant invention so long as there is sufficient ammonium hydroxide present to carry out the reaction. For example, the alcohol content may vary from about 20 to 90 percent, though normally it is preferred to maintain the amount of alcohol at about 50 percent.

It will also be readily understood that the 3-nitrosalicylic acid starting material may be substituted in its 4, 5 and 6 positions by inert substituents which do not adversely affect the instant novel process.

While the instant invention has been generically described above, to insure maximum economical results it is preferred to produce a 2-amino-3-nitrobenzoic acid by reacting 3-nitrosalicylic acid with ammonium hydroxide per se at a temperature of about 170° C. By way of exemplification, the preferred process and recovery may be shown by the following equation:

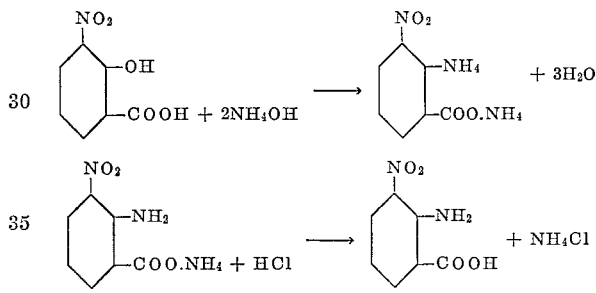

The compounds of this invention are particularly valuable intermediates in the synthesis of organic dyestuffs, antioxidants, lubricants and pharmaceuticals. For example, 2-amino-3-nitrobenzoic acid has been found to be a very useful intermediate for preparing 2,3-dichloro-quinoxaline, which in turn has been found to be a good reactive hook for reactive dyes as shown in Belgian Patent 627,122.

The following examples are illustrative of the present invention and are not to be regarded as limitative. It is to be understood that all parts, percentages and proportions referred to herein and in the appended claims are by weight unless otherwise indicated.

Example I

A mixture of 20 g. of 3-nitrosalicylic acid and 200 ml. of conc. ammonium hydroxide was heated in a glass lined autoclave at 170° C. for 12 hours. The reaction mixture was then acidified with conc. HCl and the precipitate was filtered and dried to give 14.6 g. of 2-amino-3-nitrobenzoic acid, M.P. 200–202° C.

Like results may be produced by following the same procedure but substituting a metallic salt of 3-nitrosalicylic acid, such as, sodium 3-nitrosalicylate for the 3-nitrosalicylic acid starting material.

Example II

The process of Example I was repeated except that the reaction was conducted at 130° C. for 48 hours to give 10 g. of 2-amino-3-nitrobenzoic acid, M.P. 200–202° C.

Example III 20 g. of 3-nitrosalicylic acid were added to a mixture of 200 ml. of conc. ammonium hydroxide and isopropanol, about a 50:50 percent mixture, and heated in a glass lined autoclave at 160° C. for 12 hours. The reaction mixture was then acidified with conc. HCl and the precipitate was filtered and dried to give 17 g. of 2-amino-3-nitrobenzoic acid, M.P. 200–202° C. Similar results may be produced by replacing isopropanol with other aliphatic alcohols, such as, methanol, ethanol, propanol, butanol, etc.

Various modifications and variations of this invention will be obvious to a worker skilled in the art and it is understood that such modifications and variations are to be included within the purview of this application and the spirit and scope of the appended claims.

I claim:

1. The process for preparing 2-amino-3-nitrobenzoic acid which comprises reacting a nitrophenyl compound selected from the group consisting of 3-nitrosalicyclic acid, alkali metal salts of 3-nitrosalicyclic acid and alkali earth metal salts of 3-nitrosalicyclic acid with an alkali solution consisting essentially of ammonium hydroxide or a solution of ammonium hydroxide in a lower alkanol of 1 to 4 carbon atoms at a temperature in the range of about 120° C. to about 180° C. and recovering said 2-amino-3-nitrobenzoic acid.

2. The process according to claim 1, which comprises reacting 3-nitrosalicylic acid with ammonium hydroxide.

3. The process according to claim 2, wherein the temperature is about 170° C.

4. The process according to claim 1, which comprises reacting 3-nitrosalicylic acid with an alcoholic alkali solution of isopropanol and ammonium hydroxide.

References Cited

Organic Chemistry, by Finar, vol. I (1963), p. 620 relied on.

LORRAINE A. WEINBERGER, Primary Examiner

L. A. THAXTON, Assistant Examiner